United States Patent [19]

Ryoke et al.

[11] Patent Number: 5,326,618
[45] Date of Patent: Jul. 5, 1994

[54] MAGNETIC RECORDING MEDIUM AND PROCESS FOR PRODUCTION THEREOF

[75] Inventors: Katsumi Ryoke; Yutaka Kakuishi; Toshiyuki Kitahara; Akihiro Matsufuji, all of Kanagawa, Japan

[73] Assignee: Fuji Photo Film Co., Ltd., Kanagawa, Japan

[21] Appl. No.: 858,189

[22] Filed: Mar. 26, 1992

[30] Foreign Application Priority Data

Mar. 27, 1991 [JP] Japan .................. 3-063447

[51] Int. Cl.⁵ .......................... B32B 3/10; B32B 7/02; B32B 5/16; G11B 5/66
[52] U.S. Cl. .................................. 428/141; 428/212; 428/213; 428/323; 428/329; 428/694 R; 428/694 B; 428/694 BB; 428/694 BN; 428/694 BA; 428/694 BM; 428/694 SL; 427/127; 427/128; 427/130; 427/132
[58] Field of Search ............... 428/694, 900, 212, 213, 428/323, 329, 141, 694 R, 694 B, 694 BB, 694 BM, 694 BA, 694 SL; 427/127, 128, 130, 132

[56] References Cited

U.S. PATENT DOCUMENTS

| | | |
|---|---|---|
| 4,624,883 | 11/1986 | Yamaguchi et al. ............ 428/212 |
| 4,911,997 | 3/1990 | Asai et al. ............ 428/329 |
| 4,959,263 | 9/1990 | Aonuma et al. ............ 428/329 |
| 4,965,120 | 10/1990 | Ono et al. ............ 428/213 |
| 5,051,291 | 9/1991 | Kawahara et al. ............ 428/141 |
| 5,084,343 | 1/1992 | Ogawa et al. ............ 428/329 |
| 5,089,317 | 2/1992 | Noguchi et al. ............ 428/212 |
| 5,098,773 | 3/1992 | Saito et al. ............ 428/212 |
| 5,132,179 | 7/1992 | Hashimoto et al. ............ 428/403 |
| 5,156,908 | 10/1992 | Araki et al. ............ 428/323 |

FOREIGN PATENT DOCUMENTS

| | | |
|---|---|---|
| 47-18572 | 5/1972 | Japan . |
| 0503936 | 2/1975 | Japan . |
| 0512801 | 1/1976 | Japan . |
| 57-162129 | 10/1982 | Japan . |
| 58-45088 | 3/1983 | Japan . |
| 58-85931 | 5/1983 | Japan . |
| 59-227026 | 12/1984 | Japan . |
| 2-210606 | 8/1990 | Japan . |

*Primary Examiner*—Paul J. Thibodeau
*Assistant Examiner*—Leszek Kiliman
*Attorney, Agent, or Firm*—Sughrue, Mion, Zinn, Macpeak & Seas

[57] ABSTRACT

A magnetic recording medium is described comprising a nonmagnetic support having formed thereon a magnetic layer containing a ferromagnetic powder, an abrasive, and a binder, wherein the ferromagnetic powder is a metal magnetic powder having a crystallite size of not larger than 200 Å, the abrasive comprises (i) an inorganic powder having a Mohs' hardness of more than 9 and a mean particle size of 0.1 to 0.9 μm which is contained in an amount of from 0.1 to 10 parts by weight per 100 parts by weight of the ferromagnetic powder, and a center-line average surface roughness (Ra) of the magnetic layer is less than 5 nm. The magnetic recording medium exhibits improved properties in C/N, running durability and drop-out. A process of producing the recording medium is also disclosed involving a calender treatment with at least one pair of metal rolls.

6 Claims, No Drawings

MAGNETIC RECORDING MEDIUM AND PROCESS FOR PRODUCTION THEREOF

FIELD OF THE INVENTION

The present invention relates to a magnetic recording medium composed of a nonmagnetic support and a magnetic layer, and also to a process for producing it. More particularly, the invention relates to a magnetic recording medium having a magnetic layer wherein C/N (carrier/noise ratio) and the occurrence of drop-out are improved, and the reduction of the output is prevented; and, to a process for production thereof.

BACKGROUND OF THE INVENTION

A magnetic recording medium is widely used as a recording tape, a video tape, a floppy disk, etc. A magnetic recording medium is fundamentally composed of a nonmagnetic support having formed thereon a magnetic layer composed of a ferromagnetic powder dispersed in a binder.

A magnetic recording medium is required to be excellent in various characteristics such as electromagnetic characteristics, running durability, running property, etc. That is, in an audio tape for recording and reproducing music, a higher original sound reproducing faculty is required. Also, a video tape is required to be excellent in electromagnetic characteristics such as original image reproducing, etc.

Furthermore, a magnetic recording medium is required to have such excellent electromagnetic characteristics, and at the same time have good running durability as described above. For obtaining good running durability, the function of abrasives has an important role. That is, the abrasives contained in the magnetic layer are distributed all over the magnetic layer, but parts thereof exist at the surface of the magnetic layer. Consequently, when the magnetic recording medium runs and comes in contact with parts of the running route, such as a magnetic head, etc., the abrasives existing at the surface of the magnetic layer give a polishing effect at the contact surface between the surface of the magnetic layer and the magnetic head, etc. Accordingly, by containing abrasives in the magnetic layer, the running durability of the magnetic recording medium can be improved. However, the abrasives existing at the surface of the magnetic layer are only a part of the abrasives added to the magnetic layer. The abrasives remaining in the magnetic layer may make it difficult to obtain a sufficiently excellent running durability.

For example, when the amount of abrasives is increased for improving the running durability of a magnetic recording medium, the content of a ferromagnetic powder is reduced, and; further, when abrasives having large particle sizes are used, the abrasives are liable to properly project over the surface of the magnetic layer. This results in deterioration of the electromagnetic characteristics. Also, the use of the abovedescribed abrasives having large particle sizes together with abrasives having small particle sizes has been described in JP-A-57-162129 and JP-A-58-85931 (the term "JP-A" as used herein means an "unexamined published Japanese patent application"), but by the foregoing methods, sufficient electromagnetic characteristics have not been obtained.

For example, JP-A-58-85931 discloses that the magnetic layer contains two kinds of abrasives each having a different mean particle size, e.g, an abrasive having a mean particle size of from 0.05 to 0.30 $\mu$m, and an abrasive having 0.5 to 15 $\mu$m. However, even by the combination of such abrasives, it is impossible to improve C/N while preventing the increase of drop-out, and; further, it is impossible to prevent the reduction of the output.

Additionally, the use of abrasives having a Mohs' hardness of more than 9.0 is described, e.g., in JP-B-47-18572, JP-B-50-3936, JP-B-51-2801, JP-B-58-45088 (the term "JP-B" as used herein means an "examined published Japanese patent application") and JP-A-59-227026, but by the foregoing disclosures, the polishing faculty of the magnetic recording medium is improved but the good surface property of the magnetic layer cannot be obtained. For example, in the technique disclosed by JP-A-59-227026, the surface property of about 25 nm only is obtained. On the other hand, by subjecting the magnetic recording medium to a surface smoothening treatment using metal rolls, the surface property of the magnetic layer is improved but the durability of the magnetic layer is not. Also, by using a metal magnetic powder having fine particle sizes, C/N is improved but the durability of the magnetic layer is not.

Recently, in a video tape using a metal (or alloy) ferromagnetic powder for increasing the high recording density, the reduction of the recording width and the reduction of the thickness of the magnetic layer has been practiced. However, this resulted in a narrowing of the width of a magnetic recording head whereby the durability of the magnetic head was reduced. Thus, a hard material such as silicon nitride, aluminum nitride, etc., has been used at the head portion of the magnetic head, as disclosed in JP-A-2-210606. The use of such a magnetic head causes problems in that the video tape is scratched by the magnetic head, the occurrence of drop-out is increased, and the output of the magnetic recording medium is reduced. Further, the increase of the polishing faculty for the magnetic head encounters the trouble of reducing the output of the video tape.

For improving C/N, it is necessary to increase the packing density of the ferromagnetic powder, and to achieve this purpose, it has been desired to keep the polishing faculty of the magnetic layer with a lower amount of abrasives. Also, for improving C/N, super smoothening of the surface of the magnetic layer and fining of the size of a ferromagnetic powder are effective, but in this case, problems occur; namely, the surface of the magnetic layer is scratched by a hard magnetic head, and the durability of the magnetic recording medium is reduced.

SUMMARY OF THE INVENTION

As the result of various investigations on metal ferromagnetic powders, inorganic powders (abrasives), and a center-line average surface roughness (Ra) of the magnetic layer for solving the above-described problems, it has been discovered that a magnetic recording medium simultaneously having excellent electromagnetic characteristics and a high durability can be obtained by using a specific metal ferromagnetic powder in combination with a specific inorganic powder(s). Also, it has been discovered that by using a combination of an inorganic powder having a Mohs' hardness of 10.0 and an inorganic powder having a Mohs' hardness of from 8.0 to 9.0, the reduction of output can further be prevented.

Based on these discoveries, the present invention has been attained.

The object of the present invention is to provide a magnetic recording medium keeping high C/N and showing a high durability using a metal ferromagnetic powder by restraining the reduction of the output.

Another object of this invention is to provide a process for producing the foregoing magnetic recording medium.

It has now been discovered that the abovedescribed objects can be achieved by the invention as described below.

(1) A magnetic recording medium comprising a nonmagnetic support having formed thereon a magnetic layer containing a ferromagnetic powder, an abrasive, and a binder, wherein the ferromagnetic powder is a metal magnetic powder having a crystallite size of not larger than 200 Å, the abrasive comprises (i) an inorganic powder having a Mohs' hardness of more than 9 and a mean particle size of 0.1 to 0.9 μm which is contained in an amount of from 0.1 to 10 parts by weight per 100 parts by weight of the ferromagnetic powder, and a center-line average surface roughness (Ra) of the magnetic layer is less than 5 nm.

(2) A process for producing a magnetic recording medium, which comprises
  (1) coating a magnetic coating composition, wherein the magnetic coating composition contains a metal magnetic powder as a ferromagnetic powder having a crystallite size not larger than 200 Å, an abrasive comprised of an inorganic powder having a Mohs' hardness of more than 9 and a mean particle size of 0.1 to 0.9 μm which is contained in an amount of 0.1 to 10 parts by weight per 100 parts by weight of the ferromagnetic powder, and a binder on a nonmagnetic support to form a coated layer on said nonmagnetic support,
  (2) orienting the coated layer,
  (3) drying the coated layer,
  (4) passing the coated product thus obtained through a calender roll composed of at least one pair of metal rolls, and
  (5) slitting the coated product.

DETAILED DESCRIPTION OF THE INVENTION

In this invention, the packing ratio or density of a ferromagnetic metal powder is improved by using a small amount of an abrasive having a Mohs' hardness of more than 9 in the magnetic layer, C/N is improved by using a fine particle magnetic substance having a crystallite size of not larger than 200 Å as the ferromagnetic metal powder, and; further, the magnetic recording medium is treated by a metal roll calender for a supersmooth magnetic layer surface. Thus, in this invention, the surface of the magnetic layer is made smoother, and the durability of the magnetic layer is not deteriorated since abrasives having a high hardness are uniformly dispersed in the magnetic layer.

The magnetic layer of this invention contains a metal magnetic powder as a ferromagnetic powder, a binder, and a small amount of an abrasive having a Mohs' hardness of more than 9, such as diamond, SiC, BN, WC, $Si_3N_4$, TiC, and $B_4C$. The abrasive having a mean particle size of 0.1 to 0.9 μm is usually used in an amount of 0.1 to 10 parts by weight, preferably 0.2 to 8 parts by weight, per 100 parts by weight of the ferromagnetic powder. Diamond particles having a mean particle size of 0.2 to 0.9 μm are preferably used for the purpose.

The magnetic layer may further contain other abrasives having a Mohs' hardness of 8 to 9 such as alumina and chromium oxide, in combination with the above-described abrasives, provided that the total amount of abrasives having a Mohs' hardness of more than 9 and those having a Mohs' hardness of 8 to 9 is within the range of from 0.1 to 20 parts by weight per 100 parts by weight of the ferromagnetic powder. The abrasives having a Mohs' hardness of 8 to 9 generally have a mean particle size of 0.01 to 1.0 μm and they are preferably used with those having a Mohs' hardness of 10 such as diamond.

By using a combination of an abrasive having a Mohs' hardness of 10 and an abrasive having a Mohs' hardness of from 8 to 9, in other words, by using abrasives having an ordinary hardness in a mixture with an abrasive having the hardest Mohs' hardness of 10, the polishing faculty of the magnetic recording medium increases to remove stains on the magnetic head, and; hence, the magnetic layer is always brought into contact with the cleaned surface of the magnetic head, whereby the reduction of the output can be remarkably prevented. Also, the durability of the magnetic recording medium is improved, and scratched trashes are not formed (whereby the amount of drop-out is decreased).

Furthermore, since the magnetic recording medium of this invention removes stains on the magnetic head and is always brought into contact with the cleaned surface of the magnetic head, the excellent effect of improving C/N is obtained. Also, without wholly using an expensive inorganic powder such as diamond, abrasives having a Mohs' hardness of from 8 to 9 as a part of the abrasives may also be used. In this case, an improved effect can be obtained over the case where only the expensive inorganic powder is used.

The magnetic recording medium of the present invention fundamentally has a construction that at least one magnetic layer containing a ferromagnetic powder and an abrasive dispersed in a binder is formed on a nonmagnetic support. The magnetic layer preferably has a thickness of 0.2 to 5 μm and preferably 1 to 3.5 μm. In the case where the magnetic layer is comprised of a multilayer structure, the uppermost layer of the magnetic layer preferably contain 0.1 to 20 parts by weight in total of abrasives having a Mohs' hardness of more than 9 and those having a Mohs' hardness of 8 to 9, provided that the amount of the former is from 0.1 to 10 parts by weight, both per 100 parts by weight of the ferromagnetic powder contained in the uppermost layer. According to the preferred embodiment, even if the uppermost layer is a thin layer, the durability, polishing faculty thereof, and C/N are improved; and the occurrence of dropout and the reduction of the output are prevented.

As the nonmagnetic support for use in this invention, there are films or sheets composed of polyesters such as polyethylene terephthalate (PET), polyethylene naphthalate (PEN), etc.; polyolefins such as polypropylene, etc.; cellulose derivatives such as cellulose triacetate, cellulose diacetate, etc.; vinyl series resins such as polyvinyl chloride, polyvinylidene chloride, etc.; or synthetic resins such as polycarbonate, polyamide, polyamidoimide, polyimide, etc.; films of nonmagnetic metals such as aluminum, copper, stainless steel, etc.; papers; ceramic sheets, etc. Of these, polyethylene naphthalate is preferred.

The thickness of the support is generally in the range of from 4 to 11 μm, and preferably from 4 to 9 μm, and a center line average surface roughness (Ra) of at least one surface of the support is preferably 15 nm or less and more preferably from 4 to 13 nm. The support preferably has the Young's modulus in the lengthwise direction (machine direction) (MD) of 600 to 1400 kg/mm², with the ratio of MD to the Young's modulus in the widthwise direction (transverse direction) (TD) being from 1/1 to 2/1.

There is no particular restriction on the binder resin which is used for forming the magnetic layer in this invention. Examples of the binder resin for use in this invention are vinyl chloride series copolymers (e.g., a vinyl chloride-vinyl acetate copolymer, a vinyl chloride-vinyl acetate-vinyl alcohol copolymer, a vinyl chloride-vinyl acetate-acrylic acid copolymer, a vinyl chloride-vinylidenechloride copolymer, a vinyl chloride-acrylonitrile copolymer, and an ethylene-vinyl acetate copolymer), cellulose derivatives such as a nitrocellulose resin, etc., acrylic resins; polyvinyl acetal resins, polyvinyl butyral resins, epoxy resins, phenoxy resins, and polyurethane resins (e.g., polyester series polyurethane resins, polyether series polyurethane resins, and polycarbonate polyurethane resins).

These resins may have a polar group such as a hydroxy group, a carboxy group, an epoxy group, a metal sulfonate group, a phosphoric acid group, a phosphoric acid ester group, etc.

The foregoing resins may be used singly or as a combination thereof.

For the binder resin, a curing agent can be used and, as the curing agent, polyisocyanate compounds are usually used. The polyisocyanate compound is selected from those usually used as curing agents for polyurethane resins, etc. Examples of the polyisocyanate compound are a reaction product of 1 mol of tolylene diisocyanate and 1 mol of trimethylolpropane (e.g., Desmodur L-75, trade name, made by Farbenfabriken Bayer A. G.), a reaction product of 3 mols of a diisocyanate such as xylylene diisocyanate, hexamethylene diisocyanate, etc., and 1 mol of trimethylolpropane, a burette addition compound of 3 mols of hexamethylene diisocyanate, an isocyanurate addition compound of 5 mols of tolylene diisocyanate, an isocyanurate addition compound of 3 mols of tolylene diisocyanate and 2 mols of hexamethylene diisocyanate, and a copolymer of isophorone diisocyanate and diphenylmethane diisocyanate.

Also, the binder resin for use in this invention may be subjected to a curing treatment by the irradiation of electron rays. In this treatment, a compound having a reactive double bond (e.g., urethane acrylate) can be used.

The total amount of the resin component and the curing agent is in the range of preferably from 5 to 40 parts by weight, and more preferably from 10 to 20 parts by weight to 100 parts of the ferromagnetic powder.

The ferromagnetic powder which can be used in this invention is a ferromagnetic metal powder containing iron, cobalt, or nickel and having a crystallite size of not larger than 200 Å, preferably not larger than 190 Å. Specific surface are measured by the BET method of the powder is preferably 48 m²/g or more.

Examples of the ferromagnetic metal powder are alloys in which metal components in the ferromagnetic metal powder are at least 75% by weight, more preferably at least 80% by weight, of the ferromagnetic metal powder. Of these metal components, at least one kind of a ferromagnetic metal or alloy (e.g., Fe, Co, Ni, Fe-Co, Fe-Ni, Co-Ni, and Co-Ni-Fe) is used. The other component(s) (e.g., Al, Si, S, Sc, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te, and Bi) is contained in the range of less than about 20% by weight of the metal components. Also, the foregoing ferromagnetic metal components may contain a small amount of water, a hydroxide, or an oxide.

The production process of these ferromagnetic powders is already known and the ferromagnetic powder for use in this invention can be produced according to said process. For example, an iron powder can be produced by reducing α-FeOOH with dry H₂ at 300° to 600° C. in the presence of a sintering inhibitor such as aluminum or silicon compounds.

There is no particular restriction on the form of the ferromagnetic powder for use in this invention, but usually an acicular form, a granular form, a die form, a rice-grain form, and a tabular form are used. In particular, the use of an acicular ferromagnetic powder is preferred.

The ferromagnetic powder is preferably contained in an amount of 50 to 95% by weight, more preferably 55 to 90% by weight based on the weight of the magnetic layer, and the Young's modulus of the magnetic layer in the longitudinal direction is preferably 1200 kg/mm² or more.

In this invention, a metal powder is used as the ferromagnetic powder in the magnetic layer, but conventional ferromagnetic powders such as metal oxides (e.g., γ-Fe₂O₃) which may contain a foreign metal (e.g., Co) may also be used in combination therewith as long as the effects of this invention are not lost. In the case of a dual magnetic layer, for example, the lower magnetic layer may contain a ferromagnetic metal oxide powder while the upper magnetic layer contains a ferromagnetic metal powder.

The foregoing abrasive, resin component, curing agent, and ferromagnetic powder are kneaded and dispersed together with any solvent which is usually used in preparing magnetic coating compositions (e.g., methyl ethyl ketone, dioxane, cyclohexanone, and ethyl acetate), in order to provide a magnetic coating composition. Dispersion by kneading can be carried out according to an ordinary method.

In addition, as a matter of course, the magnetic coating composition may further contain additives usually used, such as an antistatic agent (e.g., carbon black), a lubricant (e.g., a fatty acid, a fatty acid ester, and silicone oil), a dispersing agent, a filler, etc., in addition to the above-described components.

Next, the production process of the magnetic recording medium of this invention is explained.

The magnetic coating composition prepared as described above is coated on the nonmagnetic support by the following manner.

First, the coating composition for forming the magnetic layer is created by kneading and dispersing the components such as the abrasive, the resin component, the ferromagnetic powder, if necessary, the curing agent, etc., together with the organic solvent (to provide a coating composition for the magnetic layer).

For coating the foregoing magnetic coating composition, an air doctor coating method, a blade coating method, a rod coating method, an extrusion coating method, an air-knife coating method, a squeeze coating method, a dip-coating method, a reverse roll coating method, a transfer roll coating method, a gravure coating method, a kiss coating method, a cast coating method, a spray coating method, a spin coating method, etc., can be used.

In this invention, a back layer (or backing layer) may be formed on the opposite surface of the of the nonmagnetic support that is coated with the magnetic coating composition. Usually, a back layer is a layer formed by coating a composition containing granular components such as abrasives, antistatic agents, etc., and a binder dispersed in an organic solvent, on the back surface of the nonmagnetic support.

The magnetic coating composition and the coating composition for the back layer can be coated directly on the surface of the foregoing nonmagnetic support, but can also be coated through an adhesive layer, or they may be coated on the nonmagnetic support after applying a physical treatment (e.g., corona discharging, irradiation of electron beam, etc.) onto the nonmagnetic support.

Usually, the magnetic layer thus coated is subjected to a magnetic field orienting treatment in a semi-dried state in order to orient the ferromagnetic metal powders contained in the coated layer. The magnetic field orientation may be carried out by any conventional method.

Then, the coated layer is dried by a drying step to form a magnetic layer. The drying step is usually carried out by heating the coated layer to a temperature of from 50° to 120° C., and the heating time is generally from 10 seconds to 5 minutes.

After drying, the coated layer is subjected to a surface smoothening treatment. For the surface smoothening treatment, for example, a super calender roll, etc., is utilized. By applying a surface smoothening treatment, voids formed by the evaporation of the solvent during drying are eliminated to improve the packing density of the ferromagnetic powder in the magnetic layer; thereby, a magnetic recording medium having good electromagnetic characteristics can be obtained.

For a surface smoothening treatment, the treatment by a super calender by a pair of metal roll and elastic roll has hitherto been applied, but in the production process of this invention, a calender composed of at least one pair, preferably three pairs or more, of metal rolls is employed.

As the fundamental construction of the calender rolls, 3, 5, 7, or 9 rolls can be used. Also, a 4 roll construction composed of a combination of 3 metal rolls with a resin roll, or a 5 roll construction composed further of a metal roll can be used. 8 roll construction composed of a combination of 5 metal rolls, and a combination of 2 metal rolls with one resin roll can also be used. In the above construction, at least one of the rolls at the back layer side is a metal roll.

In the practice of the calendering treatment of this invention, the calendering treatment is carried out at a line pressure preferably at least 250 kg/cm, and particularly preferably at least 300 kg/cm. The temperature of the metal rolls at the magnetic layer side and the back layer side is from 40° to 110° C., and the temperature of the metal rolls at the magnetic layer side is preferably from 70° to 100° C. However, the metal roll relating to the practice of the final calendering treatment step is usually not heated so as to function as a cooling roll.

Also, there is no particular restriction on the transporting speed of the magnetic recording medium at the calendering treatment, but the calendering treatment is usually carried out at a transporting speed of from 30 to 500 meters/min, and preferably 50 meters/min or more.

As the metal rolls which are used for the calendering treatment in this invention, the center-line surface roughness (Ra, cut-off value: 0.25 nun) is preferably less than about 20 nm, and more preferably less than about 10 nm. Examples of the metal rolls for use in this invention are a copper roll, the surface of which is applied with hard chromium plating or ceramic coating; a metal roll having the surface made by a super hard alloy, etc.

For example, a metal roll prepared as follows may be used. That is, a rod of stainless steel 50 is cut such that the outer diameter is 498 mm, then hard chromium plating is applied onto the surface of the rod at a thickness of about 3 mm, and then the plated surface is removed by buffing at a depth of 1 mm to provide the surface roughness of 0.03 μm (Hmax). The metal roll thus plated and having the foregoing surface roughness is used. The Vickers hardness (HV) thereof is about 1300 degree.

After applying the surface smoothening treatment as described above, curing by heating or curing by the irradiation of electron rays may be applied to the smoothened layer. The curing step itself is already known and, in this invention, curing can be practiced according to any known method.

In this invention, the center-line average surface roughness (Ra) of the thus treated surface of the magnetic layer of the magnetic recording medium is less than 5 nm. Also, in the magnetic recording medium, it is preferable that the coercive force (Hc) thereof is at least 1400 Oe, particularly preferably at least 1500 Oe, the maximum magnetic flux density (Bm) is at least 2900 gauss, particularly preferably at least 3000 gauss, and the squareness ratio (SQ) is at least 0.83, particularly preferably at least 0.85. Also, by reducing the whole thickness of the magnetic recording medium below 13 μm, long-time recording becomes possible.

The magnetic recording medium thus prepared is slit into a desired forth. Slitting of the magnetic recording medium is usually carried out via an ordinary cutter such as a slitter, etc., under ordinary conditions.

In the magnetic recording medium of this invention, the problems of the occurrence of scratches, the increase of drop-out, the reduction of the output, etc., occurring in a conventional magnetic recording medium in which a magnetic head is comprised of a hard material such as a nitride, are solved; and, the magnetic recording medium of this invention shows excellent effects such as a high abrasion resistance, an excellent durability, etc.

As such, a magnetic head, more preferably a metal-in-gap type magnetic head, is used. For example, there is a magnetic head having a 1st core and a 2nd core each made of ferrite, wherein a high saturated magnetic flux density alloy thin film having a higher magnetic flux density than that of the cores is formed on at least one opposing face of the core in a gap formed between the two cores, and said 1st core and 2nd core are compositely integrated via the gap, said magnetic head having at least one nonmagnetic layer selected from silicon nitride, aluminum nitride, and boron nitride between the foregoing high saturated magnetic flux density alloy thin film and each core.

There is no particular restriction on the ferrite being used, but Mn-Zn ferrite or Ni-Zn ferrite can be used. The above-described nonmagnetic layer is substantially formed with one, two, or three kinds of silicon nitride, aluminum nitride, and boron nitride; and, silicon nitride, aluminum nitride, and boron nitride are usually contained in the nonmagnetic layer as the stoichiometric composition of $Si_2N_4$, AlN, and BN, but they are not restricted to these compositions. Also, the foregoing three kinds of nitrides can be used singly or as a mixture, and in the case of using two or three kinds of nitrides, the compound ratio is optional. Furthermore, the magnetic layer may contain O, Y, La, Ce, Mg, etc., as impurities in an amount of not more than 5% by weight.

Also, as the foregoing high saturated magnetic flux density thin film, an alloy containing Fe and Si, an Fe-Co series amorphous alloy, a Co-Zr series amorphous alloy, etc., can be used.

Details of such a magnetic head are described in JP-A-2-210606.

Next, the invention is explained practically by referring to the following examples, wherein "parts" are, unless otherwise indicated, by weight.

EXAMPLE 1

Composition (1) for the magnetic layer shown below, was placed in a kneader followed by sufficient kneading. Composition (2), shown below, was added followed by mixing and dispersing. Composition (3), shown below, was then dispersed to provide a magnetic coating composition.

| Magnetic Layer Composition | |
|---|---|
| (1) Metal Magnetic Powder (Hc 1500 Oe, Crystallite Size 190 Å, $\sigma s$ = 120 emu/g) | 100 parts |
| Dispersing Agent: Phosphoric Acid ester (RE 610, trade name, made by GAF) | 3 parts |
| Vinyl Chloride Resin (MR 110, trade name, made by Nippon Zeon K.K.) | 8 parts |
| Polyurethane Resin (UR 8600, trade name, made by Toyobo Co., Ltd.) | 5 parts |
| Methyl Ethyl Ketone | 8 parts |
| Cyclohexanone | 40 parts |
| | Mixture of above components |
| (2) Abrasive: Diamond (mean particle size: 0.6 μm) | 2 parts |
| Carbon Black (Asahi #50, trade name, made by Asahi Carbon K.K.) | 2 parts |
| Polyurethane Resin (UR 8600, trade name, made by Toyobo Co., Ltd.) | 3 parts |
| Methyl Ethyl Ketone | 20 parts |
| | Mixture of above components |
| (3) Polyisocyanate (C 3040, trade name, made by Nippon Polyurethane K.K.) | 4 parts |
| Lublicant: Stearic Acid Dibutyl Amide Ester | 0.5 parts |
| Lublicant: 2-Ethylhexyl Myristate | 0.5 parts |
| Lublicant: Myristic Acid/Palmitic Acid (1/1) | 0.5 parts |
| Lublicant: Oleic Acid | 0.5 parts |

| Magnetic Layer Composition | |
|---|---|
| Methyl Ethyl Ketone | 200 parts |
| | Mixture of above components |

After controlling the viscosity of the magnetic coating composition, the coating composition was coated at a dry thickness of 2.5 μm on a polyethylene naphthalate film (nonmagnetic support) having a thickness of 7 μm and a centerline average surface roughness (Ra) of 6 to 8 nm (cut-off: 0.25 mm). The coated layer was dried while oriented in a magnetic field with opposing magnets of 3000 gauss in the direction of coating. Then, after successively forming a back layer (having the composition shown below) at a thickness of 0.5 μm at the back surface side of the nonmagnetic support (having the magnetic layer), the magnetic layer was successively subjected thrice to a metal roll calender at 100° C. (the treatment speed of 150 meters/min.). The coated product was slit into a width of 0.5 inch, and then the magnetic layer was surface-treated by a sapphire blade and cleaned with a cleaning cloth (TORAYSEE, a product of TORAY INDUSTRIES, INC.) to provide a magnetic recording tape.

| Back Layer Composition | |
|---|---|
| (1) Carbon Black (BP 800, trade name, made by Cabot Corporation) | 100 parts |
| Nitrocellulose (made by Daicel Chemical Industries, Ltd.) | 20 parts |
| Polyurethane Resin (N 2301, trade name, made by Nippon Polyurethane K.K.) | 25 parts |
| Methyl Ethyl Ketone | 300 parts |
| (2) Polyisocyanate (C 3040, trade name, made by Nippon Polyurethane K.K.) | 15 parts |
| Abrasive (Hit 100, trade name, made by Sumitomo Chemical Company Limited) Dispersion | 0.3 parts |
| Barium Sulfate (BF 1, trade name, made by Sakai Chemical Industry Co., Ltd.) Dispersion | 0.1 parts |
| Dispersing Agent (copper oleate) | 0.1 parts |
| Lubricant: Stearic Acid Dibutylamide Ester | 0.7 parts |
| Lubricant: 2-Ethylhexyl Myristate | 0.7 parts |
| Methyl Ethyl Ketone | 700 parts |

The magnetic recording tape was rolled in an M2 format cassette in a length of 250 meters.

Then, by following the procedure of foregoing Example 1, under the conditions shown in Table 1 below, magnetic recording tapes of Sample Nos. 1 to 13 were prepared.

Electromagnetic characteristics of the thus prepared samples were measured using a M2 VTR with a magnetic head comprised of silicon nitride. The results are shown in Table 1 below.

TABLE 1

| Sample No. | Ferromagnetic powder Crystallite Size (Å) | Abrasives Kind (size) (μm) | Abrasives Amount (part) | Calender Material | Calender Temp. (°C) | Ra (nm) | C/N (dB) | DO Increase |
|---|---|---|---|---|---|---|---|---|
| 1 | 190 | Diamond (0.6) | 2 | Metal | 100 | 3.0 | 0.0 | 30* |
| 2 | 190 | Diamond (0.6) | 2 | Metal | 90 | 3.5 | −0.3 | 30 |
| 3 | 190 | Diamond (0.6) | 2 | Metal | 80 | 4.0 | −0.6 | 25 |
| 4 | 190 | Diamond (0.6) | 6 | Metal | 90 | 3.5 | −0.4 | 25 |
| 5 | 190 | Diamond (0.2) | 2 | Metal | 90 | 2.5 | −0.2 | 35 |
| 6 | 190 | Diamond (0.9) | 2 | Metal | 90 | 3.0 | −0.3 | 25 |
| 7 | 220 | Diamond (0.6) | 2 | Metal | 100 | 5.0 | −2.0 | 30 |

TABLE 1-continued

| Sample No. | Ferromagnetic powder Crystallite Size (Å) | Abrasives Kind (size) (μm) | Abrasives Amount (part) | Calender Material | Calender Temp. (°C.) | Ra (nm) | C/N (dB) | DO Increase |
|---|---|---|---|---|---|---|---|---|
| 8 | 250 | Diamond (0.6) | 2 | Metal | 100 | 5.5 | −4.0 | 30 |
| 9 | 190 | Diamond (0.6) | 2 | Nylon | 90 | 6.0 | −2.0 | 30 |
| 10 | 190 | Diamond (0.6) | 2 | Nylon | 100 | Tape could not be made | | |
| 11 | 190 | Alumina (0.6) | 2 | Metal | 90 | 5.5 | −0.8 | 200< |
| 12 | 190 | Alumina (0.6) | 20 | Metal | 90 | 6.5 | −2.0 | 200< |
| 13 | 190 | Alumina (0.6) | 2 | Nylon | 90 | 6.0 | −2.0 | 50 |

Sample Nos. 1 to 6: Samples of the examples of this invention.
*Standard
In the above table:
Abrasives: Diamond (Mohs' hardness of 10) made by General Electric Company Limited
Alumina (Mohs' hardness of 9) made by Sumitomo Chemical Company, Limited.
Ra: Center-line average roughness (cutoff: 0.25 mm) of the magnetic layer
DO Increase: After 100 passes of PLAY-REWIND 100 using the M2 VTR, the increased number (per/min.) of DO (drop out) at 15 μsec., −16 dB.
C/N: Output/noise at 7 MHz.

From the results shown in the above table, it can be seen that Sample Nos. 1 to 6, meeting the scope of this invention, show good results in both C/N and the DO increase; but in Sample Nos. 7 and 8 using the ferromagnetic powder having a large crystallite size, C/N is deteriorated. Also, when nylon rolls are used as the material of calender rolls, C/N is low and a magnetic recording tape cannot be prepared at the calendering temperature of 100° C. Furthermore, when alumina is used in the abrasives (Sample Nos. 11 to 13), the DO increase is very severe.

EXAMPLE 2

After sufficiently kneading composition (1) for the magnetic layer, shown below, composition (2), shown below, was dispersed therein and then composition (3), shown below, was further dispersed therein to provide a coating composition for the magnetic layer.

| Magnetic Layer Composition | |
|---|---|
| (1) Metal Magnetic Powder (Hc 1600 Oe, Crystallite Size 150 Å, $S_{BET}$ 55 m²/g, σs = 125 emu/g) | 100 parts |
| Vinyl Chloride Resin (MR 110, trade name, made by Nippon Zeon K.K.) | 10 parts |
| Polyurethane Resin (UR 8600, trade name, made by Toyobo Co., Ltd.) | 4 parts |
| Dispersing Agent: Phosphoric Acid Ester (RE 610, trade name, made by GAF Corporation) | 3 parts |
| Methyl Ethyl Ketone | 8 parts |
| Cyclohexanone | 40 parts Mixture of above components |
| (2) Abrasive: Material A (diamond or alumina used in Example 1) shown in Table 2 | X parts |
| Abrasive: Alumina (Hit 55, trade name, made by Sumitomo Chemical Company, Limited) | 1 part |
| Carbon Black (#975, trade name, made by Columbia Ribbon & Carbon Mfg. Co., Inc.) | 2 parts |
| Polyurethane Resin (UR 8600, trade name, made by Toyobo Co., Ltd.) | 3 parts |
| Methyl Ethyl Ketone | 20 parts Mixture of above components |

| Magnetic Layer Composition -continued | |
|---|---|
| (3) Polyisocyanate (C 3040, trade name, made by Nippon Polyurethane K.K.) | 3 parts |
| Lubricant: Stearic Acid Dibutylamide Ester | 0.5 part |
| Lubricant: 2-Ethylhexyl Myristate | 1 part |
| Lubricant: Myristic Acid/Palmitic Acid (1/1) | 0.5 part |
| Lubricant: Oleic Acid | 0.5 part |
| Methyl Ethyl Ketone | 200 parts Mixture of above components |

After controlling the viscosity of the magnetic coating composition described above, the coating composition was coated on a nonmagnetic support of polyethylene naphthalate film as used in Example 1 at a dry thickness of 2.5 μm; and, the coated layer was dried while oriented in a magnetic field with opposing magnets of 3000 gauss in the coating direction. Thereafter, the magnetic layer was successively subjected thrice to a metal roll calender at the line pressure of 300 kg/cm and the calendering temperature of 110° C., a back layer (having the following composition) was formed at a thickness of 0.5 μm onto the back surface of the nonmagnetic support having the magnetic layer, the coated product was slit into a width of 0.5 inch, and, after subjected to a surface treatment with a sapphire blade, the surface was cleaned with TORAYSEE to provide a magnetic recording tape.

| Back Layer Composition | |
|---|---|
| (1) Carbon Black (BP 800, trade name, made by Cabot Corporation) | 100 parts |
| Nitrocellulose (made by Daicel Chemical Industries, Ltd.) | 20 parts |
| Polyurethane Resin (N 2301, trade name, made by Nippon Polyurethane K.K.) | 25 parts |
| Methyl Ethyl Ketone | 300 parts |
| (2) Polyisocyanate (C 3040, trade name, made by Nippon Polyurethane K.K.) | 15 parts |
| Abrasive (Hit 100, trade name, made by Sumitomo Chemical Company | 0.3 part |

-continued

| Back Layer Composition | |
|---|---|
| Limited) | |
| Dispersing Agent (copper oleate) | 0.1 part |
| Methyl Ethyl Ketone | 700 parts |

The magnetic recording tape thus prepared was rolled in an M2 format cassette in a length of 250 meters.

The properties of the sample tapes prepared were measured in the same manner as in Example 1, and the results are shown in the following table.

TABLE 2

| Sample No. | Abrasives A | (X) (parts) | Size (μm) | Mohs' Hardness | Ra (nm) | Output Reduction (dB) | DO Increase | C/N (dB) |
|---|---|---|---|---|---|---|---|---|
| 1 | Diamond | 0.1 | 0.6 | 10 | 0.3 | −1.2 | 30 | +1.2 |
| 2 | " | 0.5 | 0.6 | 10 | 0.3 | −1.1 | 30 | +1.1 |
| 3 | " | 1.5 | 0.6 | 10 | 0.3 | −1.0 | 30 | +1.0 |
| 4 | " | 3.5 | 0.6 | 10 | 0.3 | −1.0 | 30 | +1.0 |
| 5 | " | 8.0 | 0.6 | 10 | 0.4 | −0.5 | 20 | +0.8 |
| 6 | " | 3.5 | 0.9 | 10 | 0.3 | −1.0 | 25 | +1.0 |
| 7 | " | 15.0 | 0.6 | 10 | 0.6 | −0.5 | 20 | +0.0* |
| 8 | " | 8.0 | 1.5 | 10 | 0.3 | −0.5 | 70 | +0.6 |
| 9 | Alumina | 3.5 | 0.6 | 9 | 0.3 | −4.0 | 70 | −0.3 |
| 10 | " | 8.0 | 0.6 | 9 | 0.4 | −3.0 | 70 | −0.5 |
| 11 | " | 15.0 | 0.6 | 9 | 0.6 | −3.0 | 70 | −1.5 |

*Standard
Sample Nos. 1 to 6: Samples of the example of this invention
In the above table:
Output Reduction: The reproduced output (20 passes) after 20 pass PLAY-REWIND by M2 VTR - the reproduced output (1 pass).

EXAMPLE 3

Magnetic recording tapes having two magnetic layers were prepared in the following manner.

Composition (1) for a lower magnetic layer was placed in a kneader followed by sufficient kneading and, after adding composition (2) thereto, shown below, followed by mixing and dispersing, composition (3), shown below, was added thereto followed by dispersing to provide a coating composition for the lower magnetic layer.

| Lower Magnetic Layer Coating Composition | |
|---|---|
| (1) Ferromagnetic Iron Oxide Fine Powder (Hc 1300 Oe, $S_{BET}$ 50 m$^2$/g, σs = 75 emu/g) | 100 parts |
| Vinyl Chloride Resin (400X 110A, trade name, made by Nippon Zeon K.K.) | 6 parts |
| Polyurethane Resin (UR 8300, trade name, made by Toyobo Co., Ltd.) | 4 parts |
| Dispersing Agent: Phosphoric Acid Ester (RE 610, trade name, made by GAF Corporation) | 2 parts |
| Methyl Ethyl Ketone | 8 parts |
| Cyclohexanone | 32 parts |
| | Mixture of above components |
| (2) Carbon Black (#975, trade name, made by Columbia Ribbon & Carbon Mfg. Co., Inc.) | 8 parts |
| Polyurethane Resin (UR 8300, trade | 2 parts |

| Lower Magnetic Layer Coating Composition | |
|---|---|
| name, made by Toyobo Co., Ltd.) | |
| Methyl Ethyl Ketone | 20 parts |
| (3) Polyisocyanate (C 3040, trade name, made by Nippon Polyurethane K.K.) | 2 parts |
| Lubricant: Stearic Acid Dibutylamide Ester | 0.5 part |
| Lubricant: 2-Ethylhexyl Myristate | 1 part |
| Lubricant: Myristic Acid/Palmitic Acid (1/1) | 0.5 part |
| Lubricant: Oleic Acid | 0.5 part |
| Methyl Ethyl Ketone | 200 parts |
| | Mixture of above components |

After controlling the viscosity of the magnetic coating composition, the coating composition was coated on a nonmagnetic support of polyethylene terephthalate as in Example 1 at a dry thickness of 2.0 μm as a lower magnetic layer.

Then, the same magnetic coagting composition as used in Example 2 except for changing the amount of the abrasive, alumina (Hit 55), to Y parts by weight as shown in Table 3) was further coated on the lower magnetic layer at a dry thickness of 0.5 μm as an upper magnetic layer, and the coated layer was dried while oriented in a magnetic field using opposing magnets of 3000 gauss in the coating direction. Thereafter, the magnetic layer formed was successively subjected to a calender treatment as in Example 2, a back layer having the same composition as in Example 2 was formed on the back surface of the nonmagnetic support at a thickness of 0.5 μm, the coated product was slit into a width of 0.5 inch, and after treating the surface of the magnetic layer with a sapphire blade, the surface was cleaned with TOREYSEE to provide a magnetic recording tape.

The magnetic recording tape thus prepared was rolled in an M2 format cassette in a length of 250 meters.

The properties of the samples thus prepared were measured in the same manner as in Example 2, and the results are shown in Table 3 below.

TABLE 3

| Sample No. | Abrasives in Upper Magnetic Layer | | | | | Ra (nm) | Output Reduction (dB) | DO Increase | C/N (dB) |
|---|---|---|---|---|---|---|---|---|---|
| | A | (X) (parts) | Size (μm) | Mohs' Hardness | (Y) (parts) | | | | |
| 1 | Diamond | 0.1 | 0.6 | 10 | 0.02 | 0.2 | −1.0 | 20 | +1.1 |
| 2 | " | 0.5 | 0.6 | 10 | 0.1 | 0.2 | −0.9 | 20 | +1.0 |
| 3 | " | 1.5 | 0.6 | 10 | 0.3 | 0.2 | −0.8 | 20 | +1.0 |
| 4 | " | 3.5 | 0.6 | 10 | 0.7 | 0.2 | −0.6 | 20 | +1.0 |
| 5 | " | 8.0 | 0.6 | 10 | 1.6 | 0.3 | −0.5 | 20 | +0.8 |
| 6 | " | 15.0 | 0.6 | 10 | 3.0 | 0.4 | −0.5 | 20 | +0.5 |
| 7 | " | 8.0 | 1.5 | 10 | 1.6 | 0.3 | −0.4 | 80 | +0.3 |
| 8 | Alumina | 3.5 | 0.6 | 9 | 0.7 | 0.2 | −6.0< | 70 | −0.2 |
| 9 | " | 8.0 | 0.6 | 9 | 1.6 | 0.3 | −6.0< | 90 | −0.4 |
| 10 | " | 15.0 | 0.6 | 9 | 3.0 | 0.5 | −4.0 | 80 | −3.0 |

Sample Nos. 1 to 5 are samples of the examples of this invention.

As is clear from the results shown in the above-described Table 2 and Table 3, it can be seen that sample Nos. 1 to 6 in Table 2, and sample Nos. 1 to 5 in Table 3, each containing a combined diamond having a Mohs' hardness of 10 and alumina having a Mohs' hardness of 9, show excellent effects in that the reduction of the output is less, the increase of DO is less (Samples 1–5 at Table 3), and C/N is high.

As described above in detail, by using a ferromagnetic powder having the crystallite size of not larger than 200 Å, calendering the magnetic layer with metal rolls to obtain the magnetic layer having a super smooth surface of less than 5.0 nm, and by using a small amount of abrasive(s) having a Mohs' hardness of more than 9 for a magnetic layer, C/N can be greatly improved, the packing density of the ferromagnetic powder is increased, and the durability of the magnetic recording medium can be improved.

Also, by reducing the total thickness of the magnetic recording medium for improving the recording density, long-time recording becomes possible. Furthermore, by using an inorganic powder having a Mohs' hardness of 10 in combination with an inorganic powder having a Mohs' hardness of 8 to 9 as abrasives for a magnetic recording layer, the reduction of the output can be remarkably prevented, C/N can be improved, and the increase of DO increases can also be inhibited.

The foregoing excellent effects of the present invention are very effective for a high-hard magnetic head comprising a nitride in the magnetic head.

While the invention has been described in detail and with reference to specific embodiments thereof, it will be apparent to one skilled in the art that various changes and modifications can be art that various changes and modifications can be made therein without departing from the spirit and scope thereof.

What is claimed is:

1. A magnetic recording medium comprising a nonmagnetic support having formed thereon a magnetic layer containing a ferromagnetic powder, an abrasive, and a binder, wherein the ferromagnetic powder is a metal magnetic powder having a crystallite size of not larger than 200 Å, and the abrasive comprises (i) an inorganic powder having a Mohs' hardness of 10 and a mean particle size of 0.1 to 0.9 μm which is contained in an amount of from 0.1 to 10 parts by weight per 100 parts by weight of the ferromagnetic powder, and (ii) an inorganic powder having a Mohs' hardness of from 8 to 9; and wherein the total amount of the inorganic powders (i) and (ii) is from 0.1 to 20 parts by weight per 100 parts by weight of the ferromagnetic powder, a center-line average surface roughness (Ra) of the magnetic layer is less than 5 nm, and said magnetic recording medium has a back layer.

2. A magnetic recording medium as in claim 1, wherein the magnetic layer has a multilayer structure, and an uppermost layer of the magnetic layer contains 0.1 to 20 parts by weight in total of the inorganic powder (i) and the inorganic powder (ii), provided that the amount of the inorganic powder (i) is from 0.1 to 10 parts by weight, per 100 parts by weight of the ferromagnetic powder contained in the uppermost layer.

3. A magnetic recording medium as in claim 1, wherein total thickness of the magnetic recording medium is less than 13 μm and the nonmagnetic support is a polyethylene naphthalate film base having a thickness of from 4 to 11 μm.

4. A magnetic recording medium as in claim 1, wherein the nonmagnetic support is a polyethylene naphthalate film base having a ratio of the Young's modulus in the lengthwise direction to that in the widthwise direction of 1/1 to 2/1.

5. A process for producing a magnetic recording medium, which comprises:
  (1) coating a magnetic coating composition, wherein the magnetic coating composition contains a metal magnetic powder as a ferromagnetic powder having a crystallite size not larger than 200 Å, an abrasive comprising (i) an inorganic powder having a Mohs' hardness of 10 and a mean particle size of 0.1 to 0.9 μm which is contained in an amount of 0.1 to 10 parts by weight per 100 parts by weight of the ferromagnetic powder, and (ii) an inorganic powder having a Mohs' hardness of from 8 to 9, wherein the total amount of the inorganic powders (i) and (ii) is from 0.1 to 20 parts by weight per 100 parts by weight of the ferromagnetic powder, and a binder on a nonmagnetic support to form a coated layer on said nonmagnetic support; and said magnetic recording medium has a back layer,
  (2) orienting the coated layer,
  (3) drying the coated layer,
  (4) passing the coated product thus obtained through a calender roll composed of at least one pair of metal rolls, and
  (5) slitting the coated product.

6. A magnetic recording system comprised of a high hardness magnetic head composed of a nitride, and a magnetic recording medium comprised of a nonmagnetic support having formed thereon a magnetic layer containing a ferromagnetic powder, an abrasive, and a binder; wherein the ferromagnetic powder is a metal magnetic powder having a crystallite size of not larger than 200 Å, the abrasive comprises (i) an inorganic powder having a Mohs' hardness of 10 and a mean particle size of 0.1 to 0.9 μm which is contained in an amount of from 0.1 to 10 parts by weight per 100 parts by weight of the ferromagnetic powder, and (ii) an inorganic powder having a Mohs hardness of from 8 to 9, wherein the total amount of the inorganic powders (i) and (ii) is from 0.1 to 20 parts by weight per 100 parts by weight of the ferromagnetic powder, a center-line average surface roughness (Ra) of the magnetic layer is less than 5 nm, and said magnetic recording medium has a back layer.

* * * * *